(12) United States Patent
Jonna et al.

(10) Patent No.: US 11,184,764 B2
(45) Date of Patent: Nov. 23, 2021

(54) METHODS AND SYSTEMS OF ESTABLISHING COMMUNICATION BETWEEN DEVICES

(71) Applicant: AMZETTA TECHNOLOGIES, LLC, Norcross, GA (US)

(72) Inventors: Rajasekhar Jonna, Duluth, GA (US); Govind Kothandapani, Suwanee, GA (US); Vinothkumar Sundaramoorthy, Lawrenceville, GA (US); Nicholas Panayioto, Brookhaven, GA (US)

(73) Assignee: AMZETTA TECHNOLOGIES, LLC, Norcross, GA (US)

( * ) Notice: Subject to any disclaimer, the term of this patent is extended or adjusted under 35 U.S.C. 154(b) by 0 days.

(21) Appl. No.: 15/378,335

(22) Filed: Dec. 14, 2016

(65) Prior Publication Data

US 2018/0167981 A1   Jun. 14, 2018

(51) Int. Cl.
*H04W 12/06*   (2021.01)
*H04W 76/10*   (2018.01)
(Continued)

(52) U.S. Cl.
CPC ......... *H04W 12/06* (2013.01); *H04L 65/1069* (2013.01); *H04N 21/4367* (2013.01);
(Continued)

(58) Field of Classification Search
CPC ....... H04W 76/02; H04W 4/008; H04W 8/24; H04W 84/18
See application file for complete search history.

(56) References Cited

U.S. PATENT DOCUMENTS 9,288,229 B2 *   3/2016   Kaufman ............... H04W 12/06
9,628,514 B2 *   4/2017   Kaufman ................ H04L 63/18
(Continued)

OTHER PUBLICATIONS

IEEE Standard for Information technology—Telecommunications and information exchange between systems—Local and metropolitan area networks—Specific requirements Part 11: Wireless LAN Medium Access Control (MAC) and Physical Layer (PHY) Specifications (Year: 2007).*

*Primary Examiner* — Gennadiy Tsvey
(74) *Attorney, Agent, or Firm* — Locke Lord LLP; Tim Tingkang Xia, Esq.

(57) ABSTRACT

A representative electronic device comprises an audio/visual device, a wireless device, a processing device, and memory. The audio/visual device transmits either audio or visual signals, or both. The wireless device transmits and receives wireless signals having communications protocol to allow connectivity and collaboration between the electronic device and a targeted device. The memory includes an authentication/connection software which has instructions that are executed by the processing device. The instructions includes the following logics: instructing the audio/visual device to transmit the visible and/or audible signals to a computing device, wherein the visible and/or audible signals includes a unique identification code associated with the electronic device, wherein the targeted device receives the unique identification code via the computing device; instructing the wireless device to transmit and receive the wireless signals to/from the targeted device, wherein the wireless signals includes the unique identification code associated with the electronic device; and establishing communication between the electronic device and the targeted device based on the unique identification code.

15 Claims, 3 Drawing Sheets

(51) Int. Cl.
  *H04W 8/24*        (2009.01)
  *H04N 21/4367*     (2011.01)
  *H04L 29/06*       (2006.01)
  *H04W 12/00*       (2021.01)
  *H04W 12/65*       (2021.01)
  *H04W 84/18*       (2009.01)
  *H04W 4/80*        (2018.01)

(52) U.S. Cl.
  CPC .......... *H04W 8/24* (2013.01); *H04W 12/009* (2019.01); *H04W 12/65* (2021.01); *H04W 76/10* (2018.02); *H04W 4/80* (2018.02); *H04W 84/18* (2013.01)

(56) References Cited

U.S. PATENT DOCUMENTS

| | | | |
|---|---|---|---|
| 9,867,050 B1* | 1/2018 | Kamini | H04W 12/084 |
| 10,025,870 B2* | 7/2018 | Bergel | G06Q 20/40 |
| 2004/0052273 A1* | 3/2004 | Karaoguz | G01S 5/0252 |
| | | | 370/465 |
| 2008/0094244 A1* | 4/2008 | Oh | H04M 1/72519 |
| | | | 340/815.45 |
| 2009/0036159 A1* | 2/2009 | Chen | H04L 12/2856 |
| | | | 455/556.1 |
| 2010/0227549 A1* | 9/2010 | Kozlay | H04L 9/0662 |
| | | | 455/26.1 |
| 2011/0086593 A1* | 4/2011 | Hardacker | H04M 1/72412 |
| | | | 455/41.3 |
| 2011/0106279 A1* | 5/2011 | Cho | G08C 17/02 |
| | | | 700/90 |
| 2014/0256260 A1* | 9/2014 | Ueda | H04L 63/18 |
| | | | 455/41.2 |
| 2014/0282967 A1* | 9/2014 | Maguire | H04W 12/068 |
| | | | 726/7 |
| 2015/0245278 A1* | 8/2015 | Scahill | H04W 48/02 |
| | | | 370/329 |
| 2015/0327060 A1* | 11/2015 | Gilson | H04L 67/16 |
| | | | 726/7 |
| 2016/0192407 A1* | 6/2016 | Fyfe | H04W 8/005 |
| | | | 370/328 |
| 2017/0041835 A1* | 2/2017 | Takemoto | H04L 65/4076 |
| 2017/0086054 A1* | 3/2017 | Azevedo | H04W 8/005 |
| 2017/0132909 A1* | 5/2017 | Rabb | G08B 25/008 |
| 2018/0053176 A1* | 2/2018 | Rawat | H04W 4/80 |

* cited by examiner

METHODS AND SYSTEMS OF ESTABLISHING COMMUNICATION BETWEEN DEVICES

BACKGROUND

More and more devices are being connected to a network and having the capability of communicating with each other is in demand among consumers.

Desirable in the art is an improved method and system of establishing communication between devices that would improve upon the conventional method and system.

BRIEF DESCRIPTION OF THE DRAWINGS

The accompanying drawings illustrate preferred embodiments of the invention, as well as other information pertinent to the disclosure, in which.

DETAILED DESCRIPTION

Exemplary systems are first discussed with reference to the figures. Although these systems are described in detail, they are provided for purposes of illustration only and various modifications are feasible. After the exemplary systems are described, examples of flow diagrams of the systems are provided to explain the manner in which at least two devices establish communication with each other.

Figure 1:
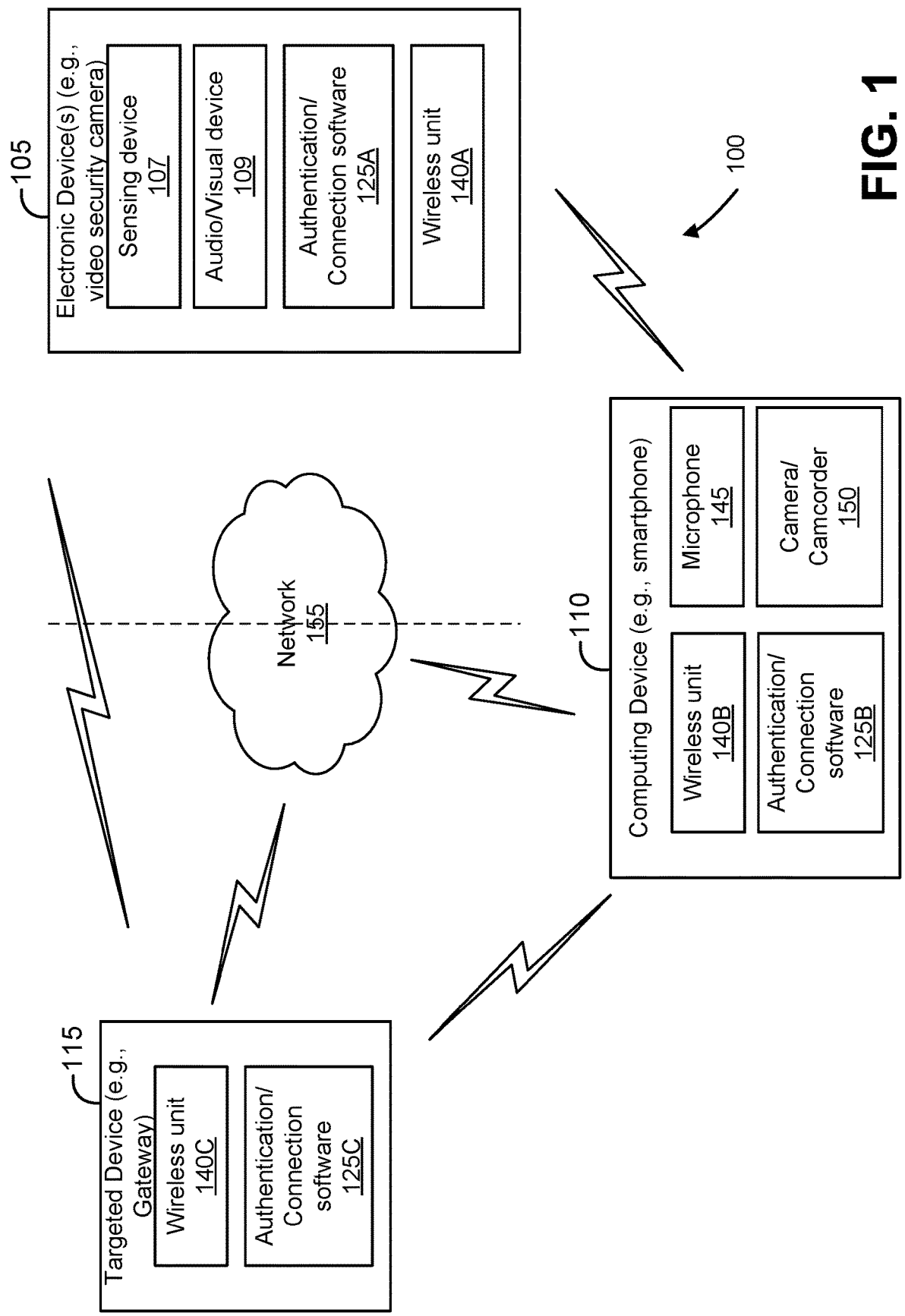
FIG. 1 is a block diagram that illustrates an embodiment of a system having an authentication/connection software.

Referring now, FIG. 1 is a block diagram that illustrates an embodiment of a system 100 having an authentication/connection software 125. The system 100 includes an electronic device 105, a computing device 110, and a targeted device 115 communicates among each other via the authentication/connection software 125. The authentication/connection software 125 can be a firmware. For example, the electronic device 105 establishes communication between the targeted device 115 and the electronic device 105 with the assistance of the computing device 110. In another example, the electronic device 105 can communicate with the computing device 110 after establishing communication with the targeted device 115. More detail description of such communication by way of the authentication/connection software 125 is further described in FIG. 2.

The electronic device 105 includes, but is not limited to, temperature sensor, humidity sensor, light sensor, motion sensor, smoke sensors, alarm system, camera, and any devices that have sensors. The computing device 110 includes, but is not limited to, smartphones, iPads, tablets, laptops, smart watches and computers. The targeted device 115 includes, but is not limited to, a gateway, router, modem and other devices that connect to a Network 155 or has the features associated with internet of things.

The electronic device 105 includes an audio/visual device 109 that transmits either audio or visual signals, or both, a wireless device 140A that transmits and receives wireless signals having communications protocol to allow connectivity and collaboration between the electronic device and a targeted device, and a sensing device 107 that detects events or changes in its environment, and transmits a corresponding output. The audio/visual device 109 can be an electroacoustic transducer device and an electric light device. The sensing device 107 can include active sensors that detects and operates from an external source of power and passive sensors that detect and respond to some type of input from the physical environment, such as temperature, humidity, motion, light, water, smoke, acceleration, global positioning, voltage, current, and power.

The wireless unit 140 can be Bluetooth®, Bluetooth® LE (BLE), and ANT/ANT+. The communications protocol is transmitted in the following standards: Message Queuing Telemetry Transport (MQTT) and Constrained Application Protocol (COAP). The computing device 110 and the targeted device 115 each includes the wireless unit 140B, C similar to that described above in connection to the electronic device 105.

Figure 2:
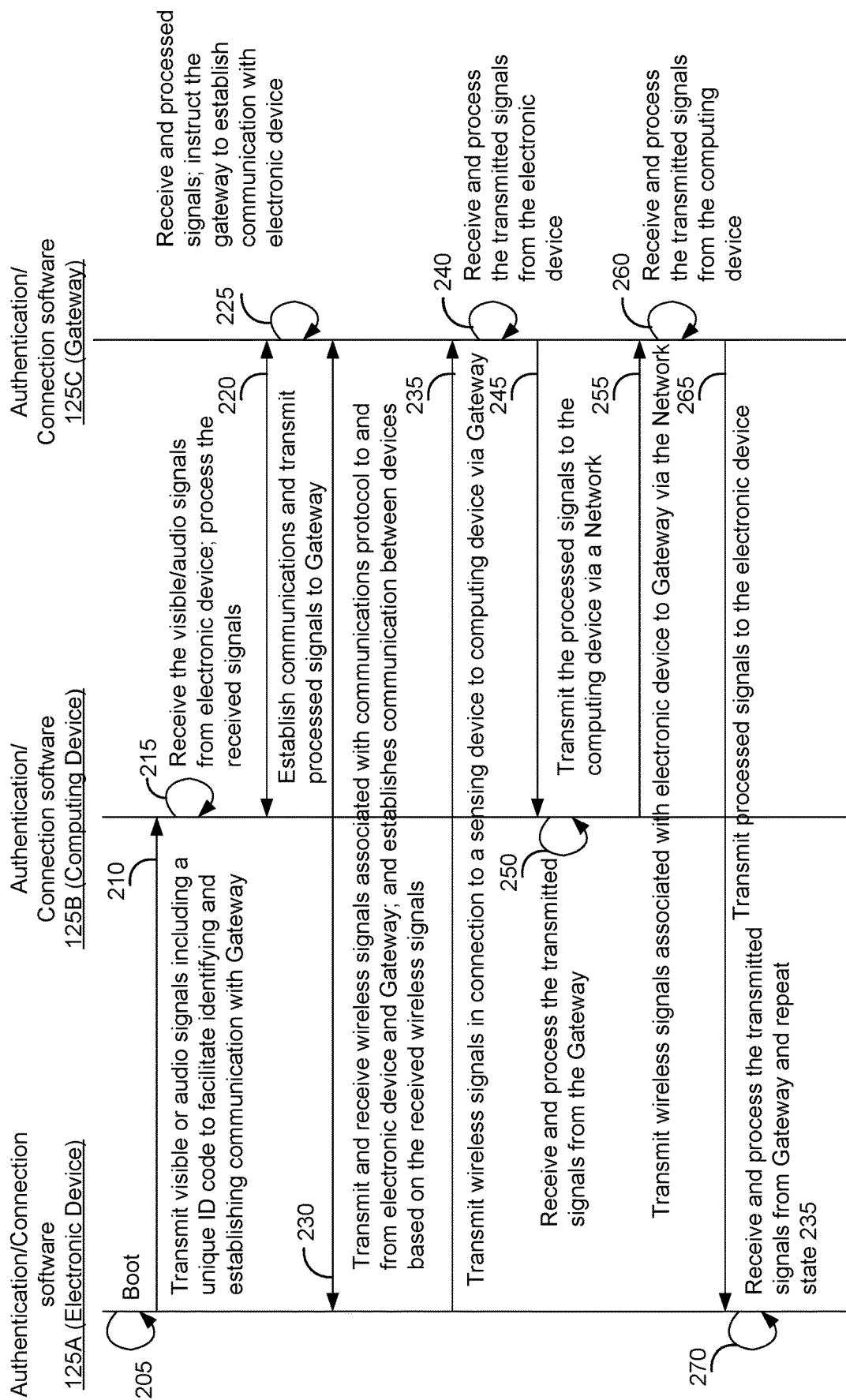
FIG. 2 is a sequence diagram that illustrates an embodiment of an authentication/connection software, such as that shown in FIG. 1.

FIG. 2 is a sequence diagram that illustrates an embodiment of an authentication/connection software, such as that shown in FIG. 1. Beginning with state 205, the electronic device 105 is booted up and initiates the operations of the authentication/connection software 125A. At state 210, the software 125A instructs an audio/visual device 109 to transmit visible and/or audible signals to a computing device 110. The visible and/or audible signals include a unique identification code associated with the electronic device 105 that facilitates identifying the electronic device 105 and establishing communication with the Gateway 115.

At state 215, the authentication/connection software 125B of the computing device 110 receives the visible and/or audible signals from the electronic device 105 via a camera/camcorder 150 (FIG. 1) and/or microphone 145 (FIG. 1), and processes the received signals. At state 220, the software 125B, C establishes communications with the Gateway 115 via the wireless units 140B, C, and transmits the processed signals that include the unique identification code to the Gateway 115.

At state 225, the authentication/connection software 125C of the computing device 110 receives the transmitted signals from the computing device 110, processes the transmitted signals, and instructs the Gateway 115 to establish communication with the electronic device 105. At state 230, the Gateway 115 and electronic device 105 transmit and receive the wireless signals associated with a communications protocol to and from the electronic device 105 and the Gateway 115. The received wireless signals include the unique identification code associated with the electronic device. Both devices 105, 115 establish communication with each other based on the received wireless signals having the unique identification code.

At state 235, the authentication/connection software 125A of the electronic device 105 instructs the wireless device 140 to transmit wireless signals in connection to a sensing device 107 to the computing device 110 via the Gateway 115. At state 240, the authentication/connection software 125C of the Gateway 115 receives and processes the transmitted signals from the electronic device 105. At state 245, the authentication/connection software 125C of the Gateway 115 transmits the processed signals to the computing device via a Network 155 (FIG. 1). At state 250, the authentication/connection software 125B of the computing device 110 receives and processes the transmitted signals from the Gateway 115.

At state 255, the authentication/connection software 125B of the computing device 110 instructs the wireless device 140B to transmit wireless signals associated with electronic device 105 to Gateway 115 via the Network 155. At state 260, the authentication/connection software 125C of the Gateway 115 receives and processes the transmitted signals from the computing device 110. At state 265, the authentication/connection software 125C of the Gateway 115 instructs the wireless device 140 to transmit processed signals to the electronic device 105. At state 270, the authentication/connection software 125A of the electronic device 105 receives and processes the transmitted signals from the Gateway 115 and repeats state 235.

Figure 3:
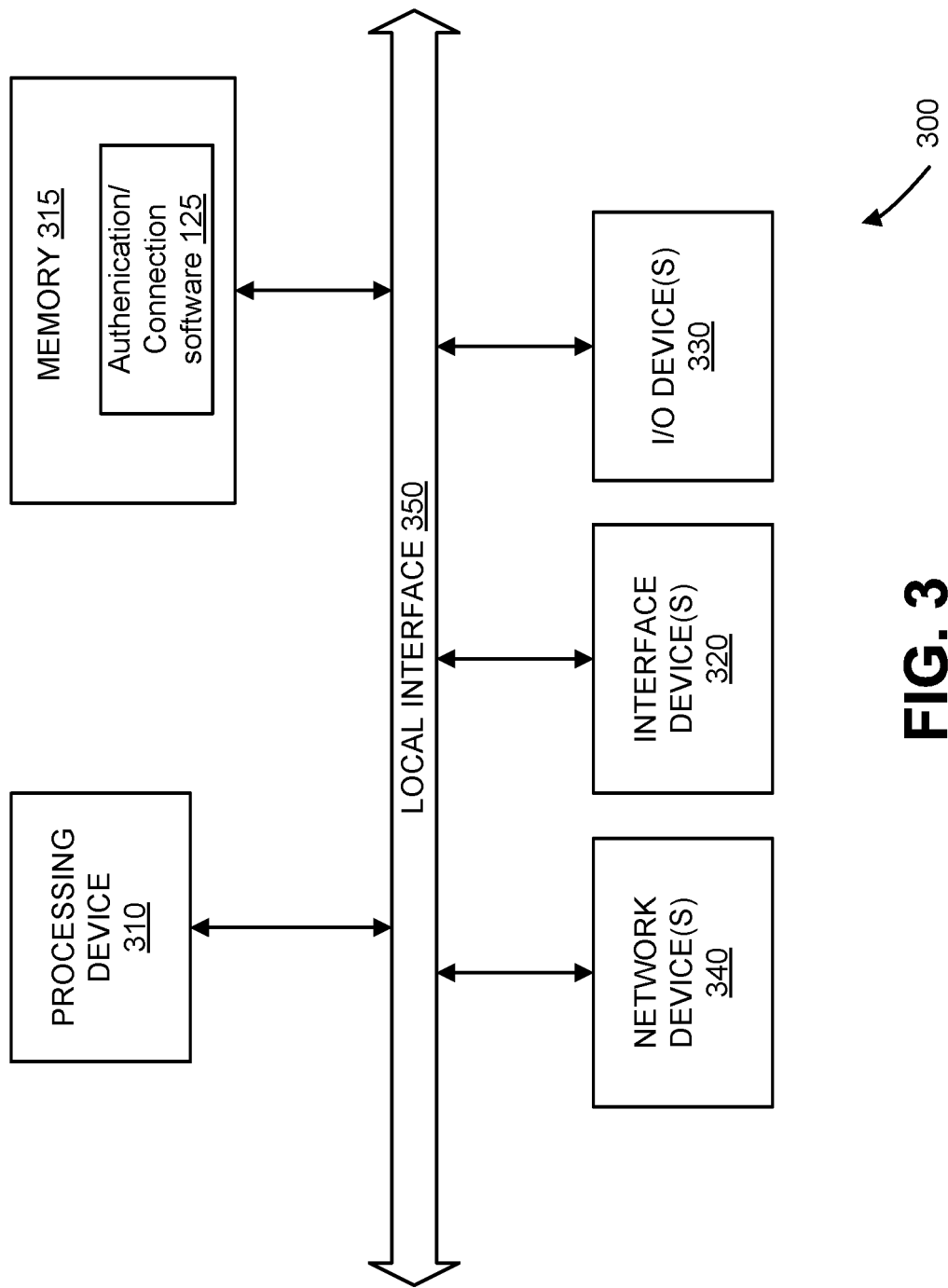
FIG. 3 is a block diagram that illustrates electrical components in a generic computing device in accordance with an embodiment of the disclosure.

FIG. 3 is a block diagram illustrating an exemplary architecture for a generic computer 300 that is similar to the architecture of the electronic device 105, computing device 110, and Gateway 115, such as that shown in FIG. 1. As indicated in FIG. 3, the computing generic computer 300 comprises a processing device 310, memory 315, one or more user interface devices 320, one or more I/O devices 330, and one or more networking devices 340, each of which is connected to a local interface 350. The processing device 310 can include any custom made or commercially available processor, a central processing unit (CPU) or an auxiliary processor among several processors associated with the generic computer 300, a semiconductor based microprocessor (in the form of a microchip), controller, or a macroprocessor. The memory 315 can include any one or a combination of volatile memory elements (e.g., random access memory (RAM, such as DRAM, SRAM, etc.)) and non-volatile memory elements (e.g., ROM, hard drive, tape, CDROM, etc.).

The one or more user interface devices 320 comprise those components with which the user (e.g., administrator) can interact with the generic computer 300. The one or more I/O devices 330 comprise components used to facilitate connection of the generic computer 300 to other devices and therefore, for instance, comprise one or more serial, parallel, small system interface (SCSI), universal serial bus (USB), or IEEE 1394 (e.g., Firewire™) connection elements. The networking devices 340 comprise the various components used to transmit and/or receive data over network 155, where provided. By way of example, the networking devices 340 include a device that can communicate both inputs and outputs, for instance, a modulator/demodulator (e.g., modem), a radio frequency (RF) or infrared (IR) transceiver, a telephonic interface, a bridge, a router, as well as a network card, etc.

The memory 315 normally comprises various programs (in software and/or firmware) including an operating system (O/S) (not shown). The O/S controls the execution of programs that include an authentication/connection software 125, and provides scheduling, input-output control, file and data management, memory management, and communication control and related services.

The systems and methods disclosed herein can be implemented in software, hardware, or a combination thereof. In some embodiments, the system and/or method is implemented in software that is stored in a memory and that is executed by a suitable microprocessor (µP) situated in a computing device. However, the systems and methods can be embodied in any computer-readable medium for use by or in connection with an instruction execution system, apparatus, or device. Such instruction execution systems include any computer-based system, processor-containing system, or other system that can fetch and execute the instructions from the instruction execution system. In the context of this disclosure, a "computer-readable medium" can be any means that can contain, store, communicate, propagate, or transport the program for use by, or in connection with, the instruction execution system. The computer readable medium can be, for example, but not limited to, a system or propagation medium that is based on electronic, magnetic, optical, electromagnetic, infrared, or semiconductor technology.

Specific examples of a computer-readable medium using electronic technology would include (but are not limited to) the following: an electrical connection (electronic) having one or more wires; a random access memory (RAM); a read-only memory (ROM); an erasable programmable read-only memory (EPROM or Flash memory). A specific example using magnetic technology includes (but is not limited to) a portable computer diskette. Specific examples using optical technology include (but are not limited to) optical fiber and compact disc read-only memory (CD-ROM).

Note that the computer-readable medium could even be paper or another suitable medium on which the program is printed. Using such a medium, the program can be electronically captured (using, for instance, optical scanning of the paper or other medium), compiled, interpreted or otherwise processed in a suitable manner, and then stored in a computer memory. In addition, the scope of the certain embodiments of the present disclosure includes embodying the functionality of the preferred embodiments of the present disclosure in logic embodied in hardware or software-configured mediums.

It should be noted that any process descriptions or blocks in flowcharts should be understood as representing modules, segments, or portions of code which include one or more executable instructions for implementing specific logical functions or steps in the process. As would be understood by those of ordinary skill in the art of the software development, alternate embodiments are also included within the scope of the disclosure. In these alternate embodiments, functions may be executed out of order from that shown or discussed, including substantially concurrently or in reverse order, depending on the functionality involved.

This description has been presented for purposes of illustration and description. It is not intended to be exhaustive or to limit the disclosure to the precise forms disclosed. Obvious modifications or variations are possible in light of the above teachings. The embodiments discussed, however, were chosen to illustrate the principles of the disclosure, and its practical application. The disclosure is thus intended to enable one of ordinary skill in the art to use the disclosure, in various embodiments and with various modifications, as are suited to the particular use contemplated. All such modifications and variation are within the scope of this disclosure, as determined by the appended claims when interpreted in accordance with the breadth to which they are fairly and legally entitled.

What is claimed is:

1. An electronic device comprising:
   a device that transmits audible or visual signals;
   a wireless device that transmits and receives wireless signals having communications protocol to allow connectivity and collaboration between the electronic device and a targeted device;
   a processing device; and
   a memory including an authentication/connection software which has instructions that are executed by the processing device, the instructions including the following logics:
   instructing the device to transmit audible or visual signals to a computing device, wherein the computing device receives the audible or visual signals, wherein the audible or visual signals include a unique identification code associated with the electronic device, wherein the computing device transmits to the targeted device the unique identification code in accordance with a Bluetooth® communication protocol;

instructing the wireless device to transmit and receive the Bluetooth® signals having the unique identification code to and from the targeted device, wherein the targeted device transmits to and receives from the wireless device Bluetooth® signals including the unique identification code associated with the electronic device; and establishing an authenticated communication between a first authentication/connection software at the electronic device and a second authentication/connection software at the targeted device in a same Bluetooth® network based on received Bluetooth® signals having the unique identification code, wherein the electronic device transmits sensor data in connection with a sensing device at the electronic device to the targeted device via the same Bluetooth® network, wherein the targeted device processes the sensor data and transmits processed sensor data to the computing device via the same Bluetooth® network.

2. The electronic device of claim 1, further comprising the sensing device that detects events or changes in its environment, and transmits a corresponding output.

3. The electronic device of claim 2, wherein the sensing device includes active sensors that detects and operates from an external source of power and passive sensors that detect and respond to some type of input from the physical environment.

4. The electronic device of claim 2, wherein the sensing device detects at least one of the following: temperature, humidity, motion, light, water, smoke, acceleration, global positioning, voltage, current, and power.

5. The electronic device of claim 1, wherein the device includes an electroacoustic transducer device.

6. The electronic device of claim 1, wherein the processing device includes a controller.

7. The electronic device of claim 1, wherein the authentication/connection software is a firmware.

8. A non-transitory computer readable medium comprising authentication/connection software that establishes communication between an electronic device and a targeted device, comprising logic of:

instructing a device of an electronic device to transmit audible or visual signals to a computing device, wherein the computing device receives the audible or visual signals, wherein the audible or visual signals include a unique identification code associated with the electronic device, wherein the computing device transmits to the targeted device the unique identification code in accordance with a Bluetooth® communication protocol;

instructing a wireless device of the electronic device to transmit and receive Bluetooth® signals having the unique identification code to and from the targeted device, wherein the targeted device transmits to and receives from the wireless device Bluetooth® signals including the unique identification code associated with the electronic device; and establishing an authenticated communication between a first authentication/connection software at the electronic device and a second authentication/connection software at the targeted device in a same Bluetooth® network based on received Bluetooth® signals having the unique identification code, wherein the electronic device transmits sensor data in connection with a sensing device at the electronic device to the targeted device via the same Bluetooth® network, wherein the targeted device processes the sensor data and transmits processed sensor data to the computing device via the same Bluetooth® network.

9. The non-transitory computer readable medium of claim 8, further comprising logic of instructing the computing device to receive the audible signals from the electronic device by way of a microphone that captures and stores the audible signals.

10. The non-transitory computer readable medium of claim 8, further comprising logic of transmitting the unique identification code to the targeted device via the computing device.

11. The non-transitory computer readable medium of claim 8, further comprising logic of communicating between the electronic device and a network via the targeted device, wherein the targeted device is a gateway.

12. The non-transitory computer readable medium of claim 11, further comprising logic of communicating between the electronic device and a computing device via the network.

13. The non-transitory computer readable medium of claim 12, further comprising logic of communicating between the electronic device and the computing device via the network based on signals from the sensing device at the electronic device.

14. A targeted device that connects with an electronic device comprising:

a wireless device that transmits and receives Bluetooth® signals to allow connectivity and collaboration between the electronic device and the targeted device;

a processing device; and a memory including an authentication/connection software which has instructions that are executed by the processing device, the instructions including the following logics:

instructing the wireless device to transmit and receive the Bluetooth® signals to and from a computing device that include a unique identification code associated with the electronic device in accordance with a Bluetooth® communication protocol, wherein the computing device receives audible or visual signals from the electronic device that include the unique identification code associated with the electronic device; and establishing an authenticated communication between a first authentication/connection software at the electronic device and a second authentication/connection software at the targeted device in a same Bluetooth® network based on received Bluetooth® signals having the unique identification code, wherein the electronic device transmits sensor data in connection with a sensing device at the electronic device to the targeted device via the same Bluetooth® network, wherein the targeted device processes the sensor data and transmits processed sensor data to the computing device via the same Bluetooth® network.

15. The electronic device of claim 14, wherein the processing device includes a controller and the authentication/connection software is a firmware.

* * * * *